United States Patent
Machida (10) Patent No.: US 7,487,202 B2
(45) Date of Patent: Feb. 3, 2009

(54) PRINTER SYSTEM, SERVER, PRINTING METHOD, PROGRAM AND RECORDING MEDIUM

(75) Inventor: Noritaka Machida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 559 days.

(21) Appl. No.: 10/107,414

(22) Filed: Mar. 28, 2002

(65) Prior Publication Data

US 2002/0140971 A1    Oct. 3, 2002

(30) Foreign Application Priority Data

Mar. 29, 2001    (JP)    ............... 2001-096503

(51) Int. Cl.
G06F 15/16    (2006.01)
(52) U.S. Cl. ...................................... 709/203
(58) Field of Classification Search ................ 709/223, 709/201–203, 217–219, 238–244; 358/1.15; 400/578; 347/15; 707/1; 712/227
See application file for complete search history.

(56) References Cited

U.S. PATENT DOCUMENTS

| | | | | |
|---|---|---|---|---|
| 4,197,560 | A * | 4/1980 | Minerd | 358/300 |
| 5,528,742 | A * | 6/1996 | Moore et al. | 715/205 |
| 5,946,412 | A * | 8/1999 | Nishikawa | 382/162 |
| 6,023,585 | A | 2/2000 | Perlman et al. | |
| 6,088,515 | A | 7/2000 | Muir et al. | |
| 6,351,317 | B1 * | 2/2002 | Sasaki et al. | 358/1.15 |
| 6,714,971 | B2 * | 3/2004 | Motoyama et al. | 709/219 |
| 6,741,555 | B1 * | 5/2004 | Li et al. | 370/229 |
| 6,754,811 | B1 * | 6/2004 | Cato et al. | 712/227 |
| 6,824,239 | B1 * | 11/2004 | Hanabusa et al. | 347/15 |
| 6,947,158 | B1 * | 9/2005 | Kitamura et al. | 358/1.15 |
| 6,965,931 | B2 * | 11/2005 | Helms | 709/223 |
| 6,985,243 | B1 * | 1/2006 | Matsueda | 358/1.15 |
| 6,992,786 | B1 * | 1/2006 | Breding et al. | 358/1.15 |
| 7,072,059 | B2 * | 7/2006 | Van Der Linden et al. | 358/1.15 |
| 7,075,670 | B1 * | 7/2006 | Koga | 358/1.15 |
| 7,171,442 | B1 * | 1/2007 | Huang | 709/203 |
| 2001/0043358 | A1 * | 11/2001 | Schwartz | 358/1.15 |
| 2001/0053304 | A1 * | 12/2001 | Noda | 400/578 |
| 2002/0062398 | A1 * | 5/2002 | Chang et al. | 709/246 |
| 2002/0065873 | A1 * | 5/2002 | Ishizuka | 709/203 |

(Continued)

FOREIGN PATENT DOCUMENTS

EP    0 952 513    10/1999
WO    WO 98/40826    9/1998

OTHER PUBLICATIONS

Kim et al., A method of printer modeling with the spectral reflectance curves using error back propagations, 1998 IEEE International Conference on vol. 2, Oct. 11-14, 1998, pp. 1796-1800.*

*Primary Examiner*—Jason D Cardone
*Assistant Examiner*—Thomas Duong
(74) *Attorney, Agent, or Firm*—Oblon, Spivak, McClelland, Maier & Neustadt, P.C.

(57) ABSTRACT

A server stores a plurality of printer drivers corresponding respectively to a plurality of printers connected to a network. A client terminal specifies a target printer for outputting data, of the plurality of printers. The server generates printing data for performing printing, using a printer driver corresponding to the specified target printer, of the plurality of printer drivers. The server sends the generated printing data to the target printer through the network. The target printer executes printing in accordance with the printing data supplied from the server.

16 Claims, 9 Drawing Sheets

U.S. PATENT DOCUMENTS

2002/0067503 A1* 6/2002 Hiatt .................. 358/1.15
2002/0089691 A1* 7/2002 Fertlitsch et al. .......... 358/1.15
2003/0005100 A1* 1/2003 Barnard et al. ............ 709/223
2003/0120624 A1* 6/2003 Poppenga et al. ............ 707/1

* cited by examiner

| CORRESPONDENCE TABLE | | |
|---|---|---|
| PRINTER IP ADDRESS | PRINTER INFORMATION (PRINTER MODEL, MANUFACTURER, PRINTING PERFORMANCE, ETC.) | DRIVER ID |
| 000.000.001 | LOCAL PRINTER, MANUFACTURER A, 12 PAGES/MIN | D00231 |
| 000.100.020 | NETWORK PRINTER, MANUFACTURER C, 20 PAGES/MIN | D02144 |

FIG. 3A

| PRINTER TABLE | | |
|---|---|---|
| PRINTER IP ADDRESS | PRINTER INFORMATION (PRINTER MODEL, MANUFACTURER, PRINTING PERFORMANCE, ETC.) | MAXIMUM COMMUNICATIONS BANDWIDTH |
| 000.000.001 | LOCAL PRINTER, MANUFACTURER A, 12 PAGES/MIN | 64KBPS |
| 000.100.020 | NETWORK PRINTER, MANUFACTURER C, 20 PAGES/MIN | 12MBPS |

PRINTER SYSTEM, SERVER, PRINTING METHOD, PROGRAM AND RECORDING MEDIUM

BACKGROUND OF THE INVENTION

1. Field of the Invention

The present invention relates to a printer system, a server, a printing method, a program and a recording medium, for controlling a printer connected through a communications network to print data.

2. Description of the Related Art

IT (Information Technology) has become common in various facilities and institutions. In this context, less paper is required.

Electronic data may somehow disappear by an obstacle occurring on a network. This usually happens because of the nature of the electronic data. Thus, important information (data) should be printed on paper, so that the important information can securely be retained.

The importance of the paper on which information is printed does not change even if a service of an ASP (Application Service Provider) is used. In other words, even if a service of the ASP is used, it does not mean that all the tasks are digitized. Hence, the printed papers are required in many cases.

Hence, even if the surroundings in work force are digitally processed, those papers on which data is printed are still necessary.

In fact, IPP (Internet Printing Protocol), based on which printers connected to the Internet print data, is standardized by the IETF (Internet Engineering Task Force).

In the conventional client-server system, many application programs are installed in each of a plurality of client terminals, and each of the plurality of client terminals executes the application programs installed therein.

Hence, the response of the system depends on the performance of each client terminal and the bandwidth of a network (a communications circuit) for connecting the server and the plurality of client terminals. In other words, to effectively utilize services of the ASP, it is necessary to highly maintain the performance of each client terminal.

Since many of application programs are installed in each of the client terminals, each application program needs to be updated on each client terminal. Therefore, many tasks are required for installing, maintaining and managing the application programs. An enormous amount of money is required to configure and maintain the system.

In the case where data is output to a target printer (IPP printer) according to IPP, each client terminal needs to have a printer driver corresponding to the IPP printer.

Hence, in the case where there are a large number of IPP printers which can be target printers to be printing data, each client terminal needs to have a large number of printer drivers respectively corresponding to the IPP printers. Each client terminal needs to include a storage device having sufficiently large storage capacity for storing the large number of printer drivers. Thus, inexpensive computers or somehow-old-type computers can not be used as client terminals in the conventional system.

In the case where the model of the IPP printer is changed, a new printer driver corresponding to the IPP printer needs to be installed in each client terminal.

In such circumstances, a great number of tasks and a large amount of money are required for establishing the environment necessary for using the IPP printer(s). In addition, expensive client terminals are needed in the conventional printer system.

SUMMARY OF THE INVENTION

The present invention has been made in consideration of the above. It is accordingly an object of the present invention to provide a printer system which can easily be realized at a low cost.

Another object thereof is to provide a printer system, a server, a printing method and a program, for performing printing through a communications network regardless of the performance of each client terminal.

Still another object thereof is to provide a recording medium which stores a program for performing printing through a network regardless of performance of each client terminal.

In order to attain the above objects, according to the first aspect of the present invention, there is provided a printer system comprising:

a plurality of printers;

a client terminal which specifies a target printer to which data is to be output, of the plurality of printers; and a server which sends printing data for performing printing to the target printer, through a communications network, and wherein the server comprises a storage unit which stores a plurality of printer drivers corresponding respectively to the plurality of printers, a generation unit which generates the printing data, using one of the plurality of printer drivers which corresponds to the target printer, and a sending unit which sends the printing data which is generated by the generation unit to the target printer through a communications network, and the target printer executes printing in accordance the printing data which is supplied from the sending unit.

According to this invention, it is not necessary that the printing performance of the client terminal be improved in accordance with the printer performance. Hence, the printer system can easily be realized at a low cost. Further, according to this invention, the server generates the printing data, and hence realizing the printing through the communications network regardless of the performance of the client terminal.

The storage unit may further store a plurality of application programs;

the client terminal may specify a target application program to be executed, of the plurality of application programs stored in the storage unit; and the server may further include an execution unit which executes the application program specified by the client terminal, of the plurality of application programs stored in the storage unit.

The generation unit may generate data for printing a result of a process executed in accordance with the specified application program.

The server may further include a downloader which downloads each of the plurality of printer drivers from a Web page of a manufacturer corresponding to each the plurality of printers.

The downloader may periodically access the Web page of each of the plurality of manufacturers, and download a latest printer driver corresponding to each of the plurality of printers.

The printer system may further comprise a speed-adjustment unit which restricts a transmission speed at which the printing data is transmitted from the server to a communications network, so that the transmission speed is equal to or less than a predetermined threshold value.

The printer system may further comprise a monitoring unit which monitors the transmission speed at which the printing data is transmitted from a network to the target printer, and sends, in a case where the transmission speed exceeds the predetermined threshold value, negotiation information representing that the transmission speed has exceeded the threshold value, to the speed-adjustment unit, and wherein the speed-adjustment unit lowers the transmission speed, upon reception of the negotiation information sent from the monitoring unit.

The printer system may operate under environment of SBC (Server Based Computing).

In order to attain the above objects, according to the second aspect of the present invention, there is provided a server comprising:

a storage unit which stores a plurality of printer drivers corresponding respectively to a plurality of printers connected to a communications network;

a generation unit which generates printing data for performing printing, using one of the plurality of printer drivers which corresponds to a target printer specified by a client terminal; and a sending unit which sends the printing data generated by the generation unit to the target printer through a communications network.

The storage unit may further store a plurality of application programs; and the server may further include an execution unit which executes one of the plurality of application programs which is specified by the client terminal.

The generation unit may generate data for printing an execution result of the application program.

The server may further comprise a downloader which downloads each of the plurality of printer drivers from a Web page of a manufacturer corresponding to each of the plurality of printers.

The downloader may periodically access the Web page of the manufacturer, and downloads a latest printer driver.

In order to attain the above objects, according to the third aspect of the present invention, there is provided a printing method comprising the steps of:

specifying, on a client terminal, a target printer for outputting data, of a plurality of printers connected to a communications network;

generating, on a server, printing data for performing printing, using a printer driver corresponding to the target printer, of a plurality of pre-set printer drivers respectively corresponding to the plurality of printers;

sending, on the server, the printing data to the target printer through a communications network; and executing, on the target printer, printing in accordance with the printing data sent from the server.

The server may store a plurality of application programs, and the method may further comprise the steps of:

specifying, on the client terminal, a target application program to be executed, of the plurality of application programs; and executing, on the server, the application program specified on the client terminal.

The step of generating the printing data includes a step of generating data for printing an execution result of the specified application program.

The printing method may further comprise the step of downloading, on the server, each of the plurality of printer drivers from a Web page of a manufacturer corresponding to each the plurality of printers.

The step of downloading may include a step of periodically accessing, on the server, the Web page of the manufacturer, and downloading a latest printer driver.

The printing method may further comprise the step of restricting a transmission speed, at which the printing data is transmitted from the server to the communications network, to be equal to or less than a predetermined threshold value.

The printing method may further comprise the steps of:

monitoring a supplying speed, at which the printing data is supplied from the network to the target printer; and lowering the transmission speed, in a case where the supplying speed has exceeded the predetermined threshold value.

In order to attain the above objects, according to the fourth aspect of the present invention, there is provided a program for controlling a computer to serve as a server comprising:

a storage unit which stores a plurality of printer drivers corresponding respectively to a plurality of printers connected to a communications network;

a generation unit which generates printing data for performing printing, using one of the plurality of printer drivers which corresponds to a target printer specified by a client terminal; and a sending unit which sends the printing data generated by the generation unit to the target printer through the communications network.

In order to attain the above objects, according to the fifth aspect of the present invention, there is provided a computer readable recording medium storing a program for controlling a computer to serve as a server comprising:

a storage unit which stores a plurality of printer drivers corresponding respectively to a plurality of printers connected to a communications network;

a generation unit which generates printing data for performing printing, using one of the plurality of printer drivers which corresponds to a target printer specified by a client terminal; and a sending unit which sends the printing data generated by the generation unit to the target printer through the communications network.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A printer system according to an embodiment of the present invention will now be explained with reference to the accompanying drawings.

Figure 1:
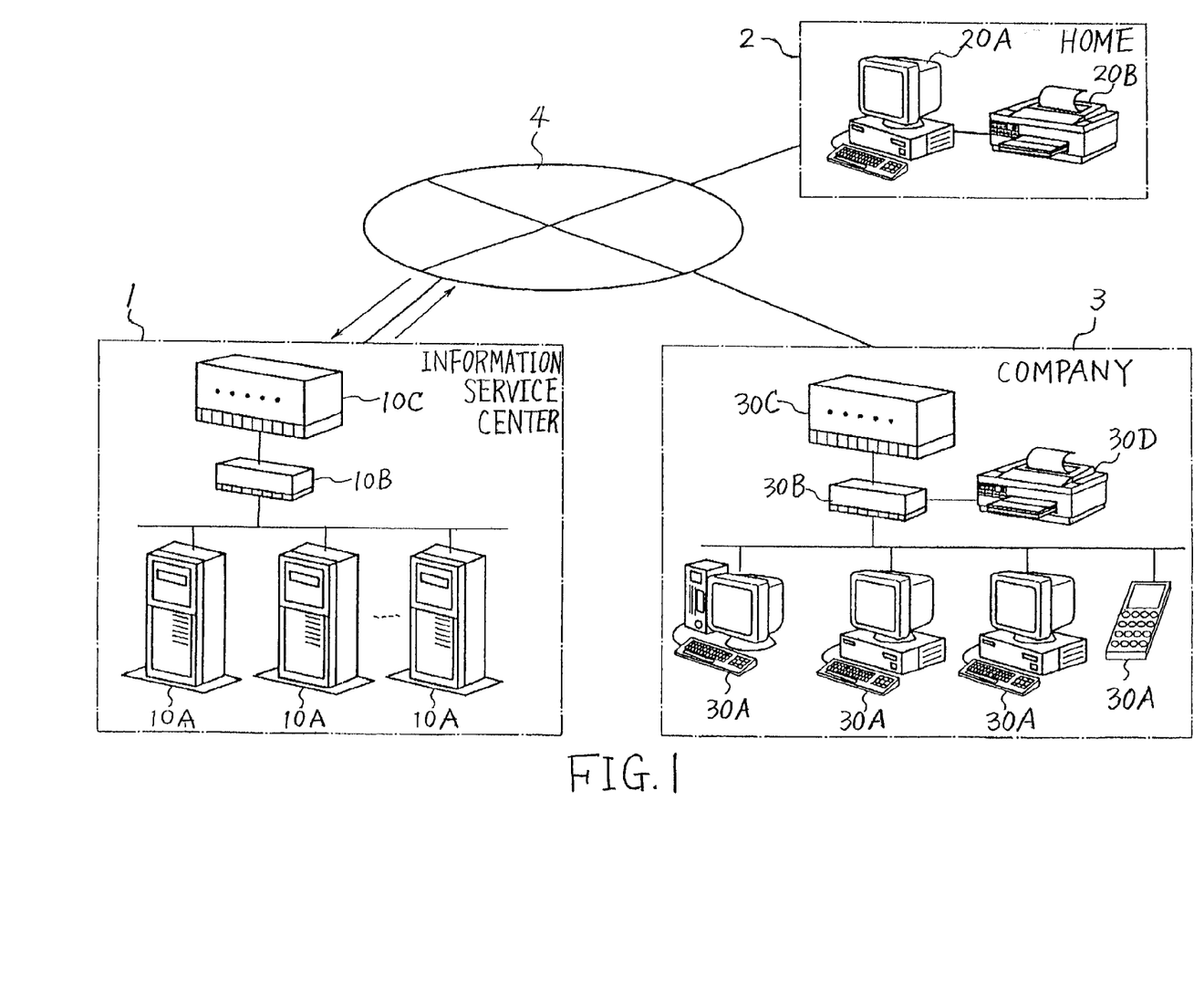
FIG. 1 is a diagram showing the structure of a printer system according to an embodiment of the present invention.

FIG. 1 is a diagram exemplarily showing the structure of the printer system according to the embodiment of the present invention.

As shown in FIG. 1, the printer system comprises a plurality of servers 10A, a hub 10B and a router 10C which are installed in an information service center 1, a client terminal 20A and a printer (a local printer) 20B which are installed at home 2, a plurality of client terminals 30A, a hub 30B, a router 30C and a printer (a network printer) 30D which are installed in a company 3, and a network 4.

The network 4 includes the Internet and a WAN (Wide Area Network), etc. The network 4 may include an intranet, a LAN (Local Area Network), etc.

The plurality of servers 10A are connected to the hub 10B, and the hub 10B is connected to the network 4 through the router 10C.

The client terminal 20A is connected to the network 4, and the printer 20B is connected to the client terminal 20A.

The plurality of client terminals 30A are connected to the hub 30B, and the hub 30B is connected to the network 4 through the router 30C. The printer 30D is connected to the hub 30B, and is shared among the plurality of client terminals 30A.

The printer system according to the embodiment of the present invention is operable under the environment of SBC (Server Based Computing). Specifically, those application programs running on the printer system are stored only in and executed only by the servers 10A. In other words, the application programs running on the printer system of this embodiment are not stored in any of the client terminals 20A and 30A.

In response to an execution request from any of the client terminals 20A and 30A, each of the servers 10A executes an application program specified in the execution request. Each of the servers 10A sends data of a display page representing the progress and result of a process executed in accordance with an application program, to any of the client terminals 20A and 30A.

In this embodiment, the printer driver of each of the printers 20B and 30D is installed in each of the servers 10A, but not in each of the client terminals 20A and 30A. The printer driver operates based on IPP (Internet Printing Protocol), and generates printing data, based on which a printing process is executed. That is, the printing data is generated by each of the servers 10A, instead of the client terminals 20A and 30A.

In response to a printing request from any of the client terminals 20A and 30A, each of the servers 10A executes the printer driver corresponding to a printer specified in the printing request. Each of the servers 10A generates printing data to be printed on the specified printer, and outputs the generated printing data onto the specified printer.

The structure of each of the servers 10A and the client terminals 20A and 30 will now specifically be described.

Figure 2A:
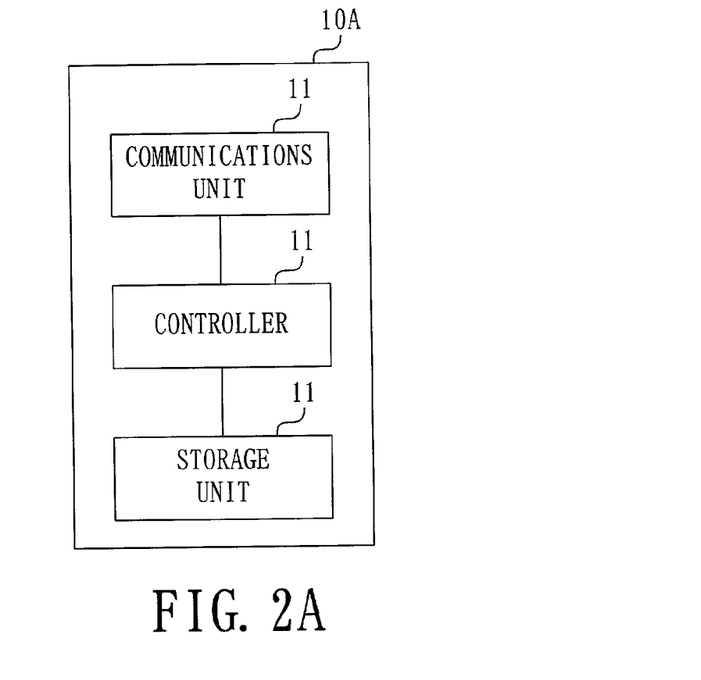
FIG. 2A is a diagram showing the structure of a server included in the printer system of FIG. 1, and FIGS. 2B and 2C are diagrams each showing the structure of a client terminal included in the printer system of FIG. 1.

As illustrated in FIG. 2A, each of the servers 10A comprises a communications unit 11, a storage unit 12 and a controller 13.

The communications unit 11 is connected to the hub 10B. The communications unit 11 supplies the controller 13 with data sent from the hub 10B, supplies the hub 10B with data sent from the controller 13.

The storage unit 12 comprises a hard disk, a ROM (Read Only Memory) and a RAM (Random Access Memory). The storage unit 12 stores programs and data for operating the server 10A including this storage unit 12.

For example, the storage unit 12 stores the entire application programs which are used in the printer system. The storage unit 12 stores each printer driver corresponding to each of the printers (the printers 20B and 30D) registered in the printer system. The storage unit 12 stores a correspondence table showing printers and drivers in association with each other.

Figure 3A:
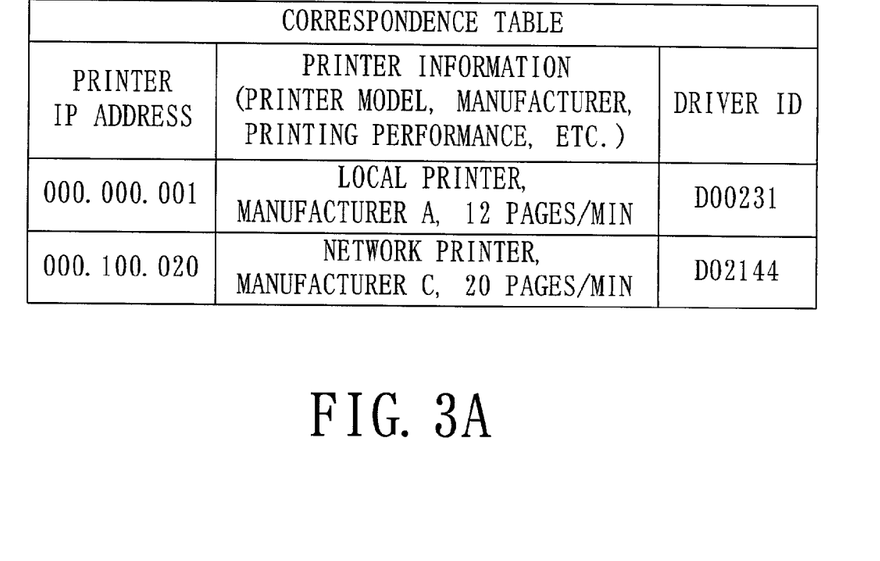
FIG. 3A is a diagram showing a correspondence table stored in a storage section included in the server of FIG. 2A.

As illustrated in FIG. 3A, the correspondence table shows an IP (Internet Protocol) address of each printer, printer information (representing printer model, manufacturer, printing performance, etc.), and a driver ID for identifying each printer driver, in association with each other.

The controller 13 includes a CPU (Central Processing Unit). The controller 13 operates in accordance with a program stored in the storage unit 12, in response to a request from any of the client terminals 20A and 30A supplied through the communication unit 11.

For example, of the application programs stored in the storage unit 12, the controller 13 executes an application program specified by any of the terminals 20A and 30A.

The controller 13 sends data of display pages representing the progress and result of a process executed in accordance with the application program, to any of the client terminals 20A and 30A through the communications unit 11.

The controller 13 refers to the correspondence table stored in the storage unit 12, and specifies a printer driver corresponding to a printer specified by any of the client terminals 20A and 30A. The controller 13 executes the specified printer driver, thereby generating the printing data for the specified printer. The controller 13 sends the generated printing data to the specified printer through the communications unit 11.

Figure 2B:
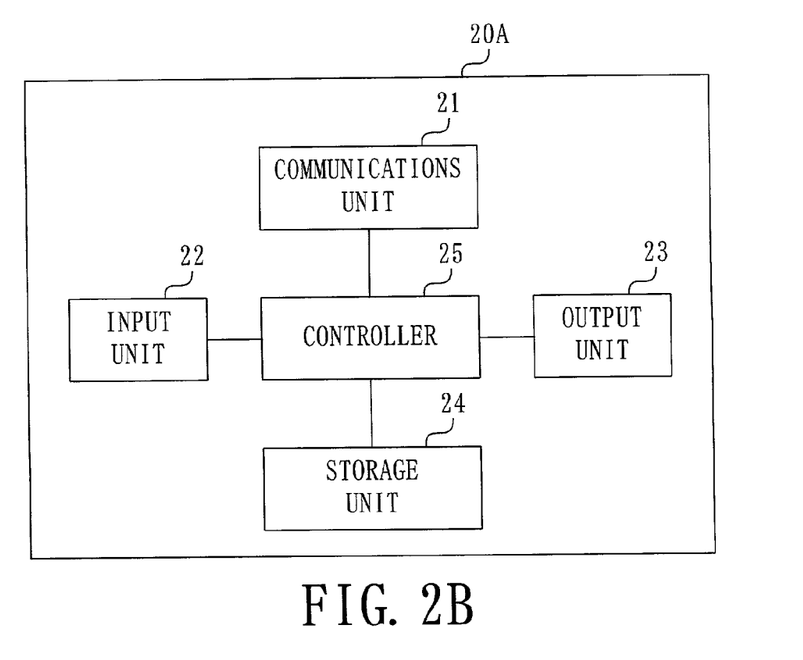

As shown in FIG. 2B, the client terminal 20A comprises a communications unit 21, an input unit 22, an output unit 23, a storage unit 24, and a controller 25. The client terminal 20A is a personal computer, for example. The client terminal 20A may be a low-priced Thin Client which does not have the execution environment of the application program.

The communications unit 21 is connected to the network 4. The communications unit 21 outputs data sent through the network 4, to the controller 25, and outputs data sent from the controller 25, to the network 4. The communications unit 21 is connected to the printer 20B, and supplies the printer 20B with printing data supplied from any of the servers 10A.

The input unit 22 includes at least one input means, such as a keyboard, a mouse, an input key, and a touch panel, etc., and is operated in accordance with a user operation of the client terminal 20A. The input unit 22 inputs various signals into the controller 25, in accordance with a user operation.

The output unit 23 includes a CRT (Cathode Ray Tube) or a liquid crystal panel, etc. The output unit 23 displays the progress or result of a process of an application program, in accordance with the data supplied from any of the server 10A.

The storage unit 24 includes at least one of a hard disk, a RAM, and a ROM, and stores a program and data for operating the client terminal 20A. For example, the storage unit 24 stores a printer table storing data regarding printers, any one of which can be a target printer for printing data thereon. The target printer for printing data is included in the printer system of this embodiment, and each of the printers 20A and 30D can be the target printer in this embodiment.

Figure 3B:
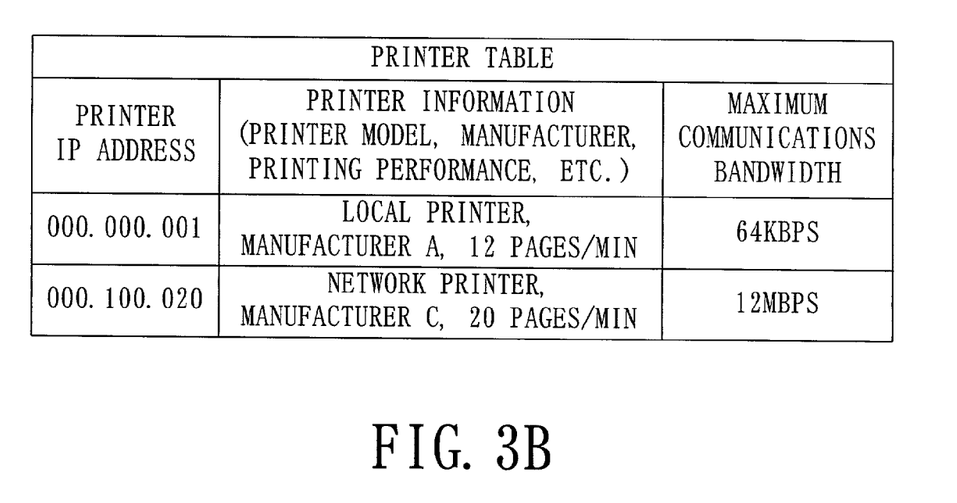
FIG. 3B is a diagram showing a printer table stored in a storage section included in the client terminal of FIG. 2B.

As illustrated in FIG. 3B, the printer table shows an IP address of each printer, printer information (printer model, manufacturers, and printing performance), and maximum communications bandwidth of each of client-side circuits for connecting printers with the network 4, etc.

The controller 25 includes a CPU, and operates in accordance with a program stored in the storage unit 24 in response to a signal input by the input unit 22.

For example, the controller 25 sends an execution request for executing a user-specified application program, to the servers 10A through the communications unit 21.

The controller 25 refers to the printer table stored in the storage unit 24, and identifies a printer specified by the user. The controller 25 sends data regarding the identified printer to the servers 10A. By this, the controller 25 requests the servers 10A to output (print) the progress or result of a process executed in accordance with the application program.

The controller 25 controls the output unit 23 to display a display page represented by the data sent from the servers 10A.

Figure 2C:
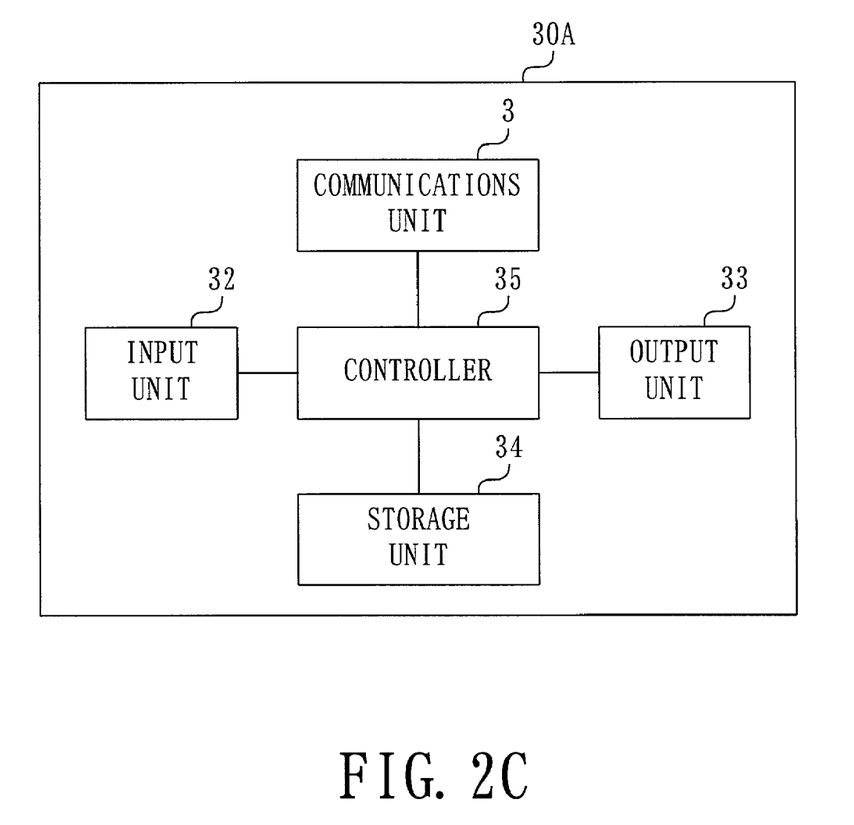

Each of the client terminals 30A is a personal computer or a low-priced Thin Client terminal that does not have the execution environment of the application programs. Each of the client terminals 30A comprises, as illustrated in FIG. 2C, a communications unit 31, an input unit 32, an output unit 33, a storage unit 34, and a controller 35.

The communications unit 31 is connected to the hub 30B. The communications unit 31 supplies the controller 35 with data sent from the hub 30B, and supplies the hub 30B with data sent from the controller 35.

The input unit 32 includes at least one of a keyboard, a mouse, an input key and a touch panel, etc., and is operated in accordance with a user operation of the client terminal 30A. The input unit 32 inputs various signals to the controller 35, in accordance with a user operation.

The output unit 33 includes a CRT or a liquid crystal panel. The output unit 33 displays the progress or result of a process of the application program, in accordance with data supplied from the servers 10.

The storage unit 34 includes at least one memory of a hard disk, a RAM and a ROM, and stores a program and data for operating the client terminal 30A including this storage unit 34. For example, the storage unit 34 stores the printer table shown in FIG. 3B.

The controller 35 includes a CPU. In response to a signal input by the input unit 32, the controller 35 operates in accordance with the program stored in the storage unit 34.

For example, the controller 35 sends an execution request for executing a user-specified application program, to the servers 10A through the communications unit 31.

The controller 35 refers to the printer table stored in the storage unit 34, and identifies a user-specified printer. The controller 35 sends data regarding the identified printer to the servers 10A. By this, the controller 35 requests the servers 10A to output (print) the progress or result of a process executed in accordance with the application program.

The controller 35 controls the output unit 33 to display a display page represented by the data sent from the server 10A thereon.

Each of the router 10C of the information service center 1, the client terminal 20 (the controller 25) at home 2 and the router 30C of the company 3 has a negotiation function for adjusting the transmission speed of the printing data so that its transmission speed is equal to or smaller than a predetermined threshold value.

Specifically, in the case where the client-side circuit is an ISDN (Integrated Services Digital Network) circuit, the maximum communications bandwidth thereof is 64 kbps. In this case, if a large amount of printing data including image data or the like is transmitted, the printing data occupies the communications bandwidth of the client-side circuit, for connecting the target printer to be receiving the printing data with the network 4.

Hence, if the printing begins, each of the client terminals 20A or 30A can not sent information for controlling the execution of the application program. As a result, the application program may stop being executed.

Hence, the router 10C of the information service center 1 controls the transmission speed of the printing data, in accordance with the maximum communications bandwidth of each client-side circuit and the printing performance of each printer. Particularly, the router 10C controls the transmission speed equal to or less than the predetermined threshold value, which is set less than the maximum communications bandwidth of the client-side circuit. For example, in the case where a client-side circuit is an ISDN circuit, the threshold value is set at 12 kbps.

The network 4 including the Internet is so-called a best-effort-type network. In other words, even if the router 10C restricts the transmission speed to be equal to or less than the threshold value, the transmission speed of the printing data flowing over the client-side circuit may not be equal to or less than the threshold value.

Hence, each of the client terminal 20A and the router 30C monitors the transmission speed of the printing data to be provided. In the case where the transmission speed exceeds the threshold value, each of the client terminal 20A and router 30C sends negotiation information representing that the transmission speed has exceeded the threshold value, to the router 10C, for example. Upon reception of the negotiation information, the router 10C decreases the transmission speed of the printing data.

In the structure where each of the router 10C, the client terminal 20A and the router 30C has the above-described negotiation function, the printing data can be transmitted at a suitable transmission speed.

Operations of the printer system according to the embodiment of the present invention will now be described.

Explanations will now be made to the case where each of the server 10A executes an application program in response to an execution request from the client terminal 20A at home 2, and the process result of the application program is output from the printer 30D of the company, by way of example.

Figure 4A:
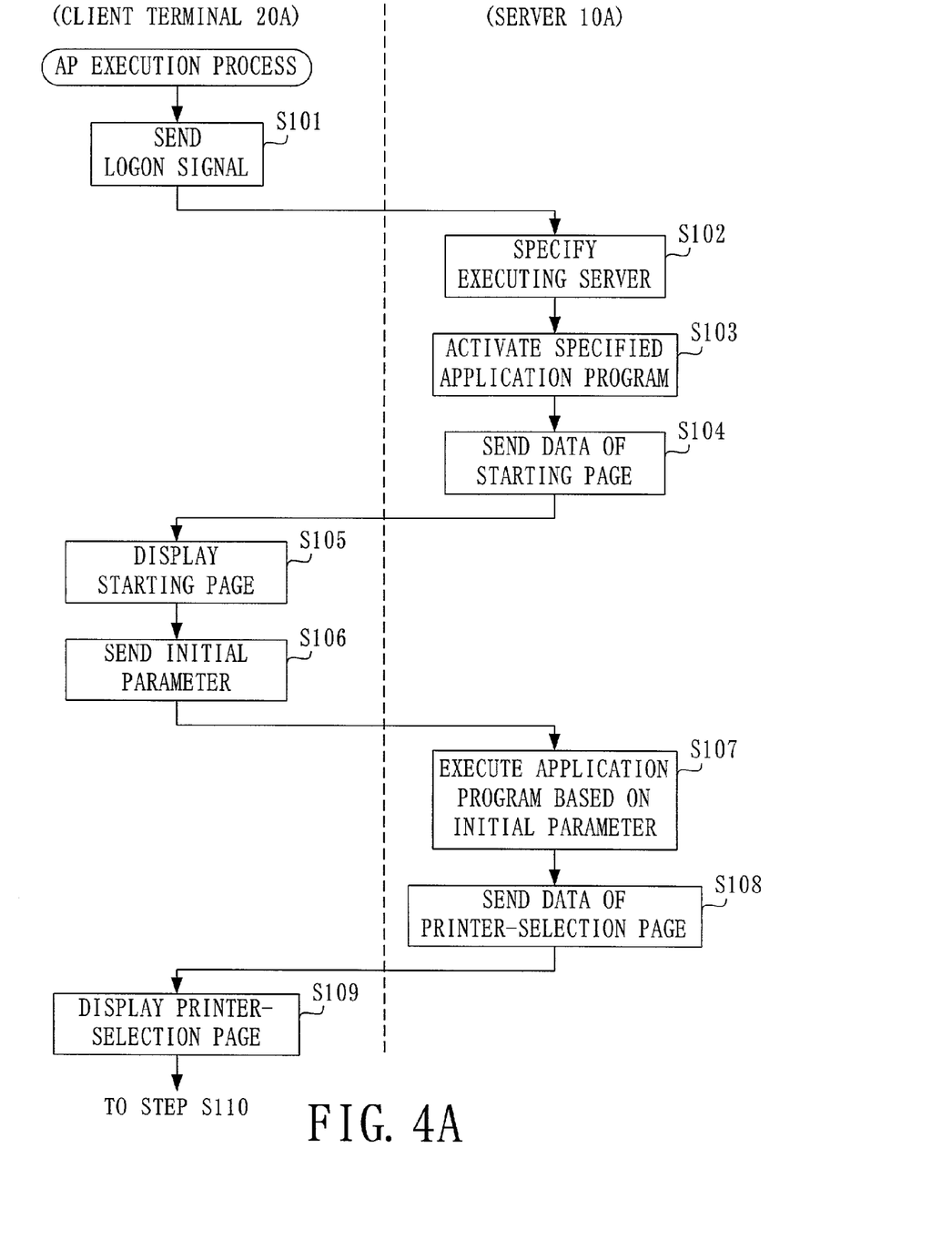
FIGS. 4A to 4C are flowcharts for explaining an AP (Application Program) execution process which is carried out by the printer system.
Figure 4B:
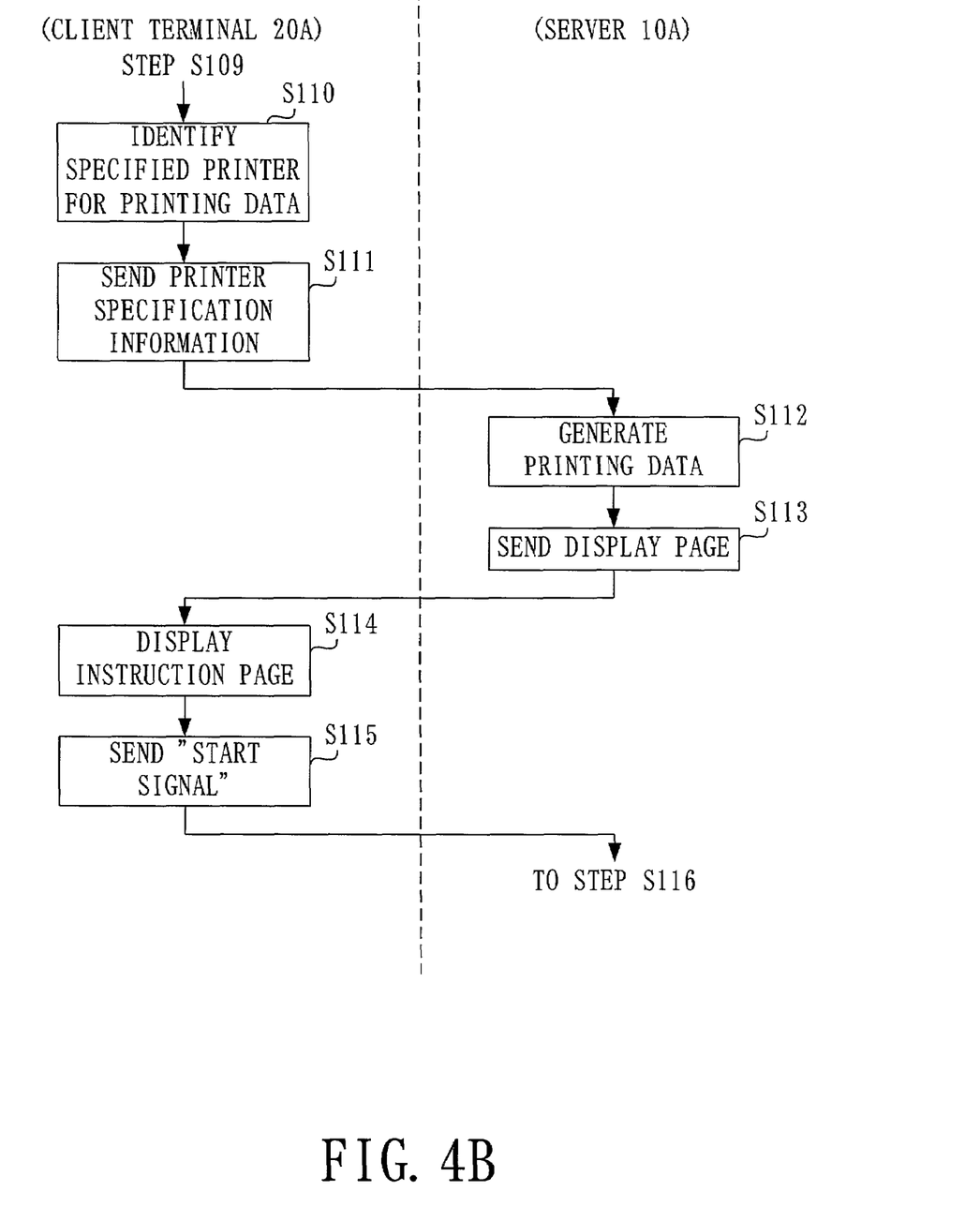

FIGS. 4A and 4B are flowcharts for explaining an execution process for executing an application program (AP), which is carried out by the printer system of the present invention.

The user of the client terminal 20A operates the input unit 22, and specifies a target application program to be executed. Specifically, the user clicks on the mouse included in the input unit 22 or presses a predetermined key of the input unit 22. In response to such a user operation, the input unit 22 inputs a signal representing the user-specified application program into the controller 25.

In response to the signal input by the input unit 22, the controller 25 sends an execution request for executing the user-specified application to the information service center 1 through the communications unit 21 (Step S101).

Specifically, the controller 25 sends a logon signal including an IP address indicating an addressee (the information service center 1), an IP address indicating a requester (the client terminal 20A) and a program ID for specifying a target application program to be executed, to the information service center 1.

Though not particularly explained later, a signal (data) to be sent through the network 4 includes an IP address indicating the sender of the signal and an IP address indicating the receiver of the signal, likewise the above.

The logon signal sent from the client terminal 20A is provided to the plurality of servers 10A, through the hub 10B and router 10C of the information service center 1.

In response to the logon signal, the plurality of servers 10A determine one executing server therewithin, as a target server to be executing the application program (Step S102).

In this case, of the servers 10A in an executable state wherein the application program specified by the program ID can be executed, the target executing server is one that is least loaded.

The controller 13 of the specified target server (the executing server) 10A activates a user-specified application program which is included in the application programs stored in the storage unit 12 (Step S103). Specifically, the controller 13 activates an application program which is specified by the provided program ID.

The controller 13 sends data of a starting page of the activated application program to the client terminal 20A through the communications unit 11, to the client terminal 20A (Step S104).

In response to data supplied from the server 10A, the controller 25 of the client terminal 20A controls the output unit 23 to display the starting page thereon (Step S105). Then, the user of the client terminal 20A can check whether the specified application program has appropriately been activated in the server 10A.

For example, on the starting page, there is a space for inputting an initial parameter necessary for executing the application program. The user of the client terminal 20A operates the input unit 22, and inputs the initial parameter on the page through the operation of the input unit 22. In response to the user operation, the input unit 22 inputs a signal representing an initial parameter input by the user to the controller 25.

In response to a signal provided from the input unit 22, the controller 25 sends input information representing the input initial parameter to the server 10A through the communications unit 21 (Step S106).

In response to the input information provided from the client terminal 20A, the controller 13 of the server 10A executes an application program, based on the initial parameter of the input information (Step S107).

During the execution of the application program, a process for displaying the process progress (FIG. 5A) and a parameter inputting process (FIG. 5B) for inputting an execution parameter for carrying on the execution of the application program are executed in the printer system of this embodiment, as needed.

Figure 5A:
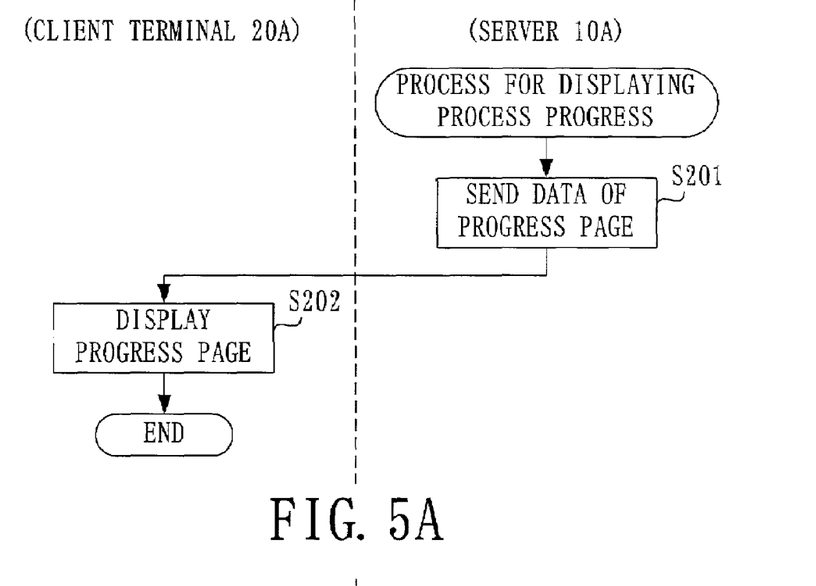
FIGS. 5A, 5B and 5C are diagrams for respectively explaining a process for displaying the progress of a process, a parameter inputting process, and a process for displaying the progress of the printing, which are all carried out by the printer system of FIG. 1 during the AP execution process shown in FIGS. 4A and 4B.

Specifically, the controller 13 of the server 10A sends data representing a progress page showing the progress of a process executed under the control of the application program to the client terminal 20A through the communications unit 11 (Step S201).

In response to data supplied from the server 10A, the controller 25 of the client terminal 20A controls the output unit 23 to display the progress page represented by the supplied data (Step S202). By this, the user of the client terminal 20A can check the progress of the process carried out by the server 10A in accordance with the application program.

Figure 5B:
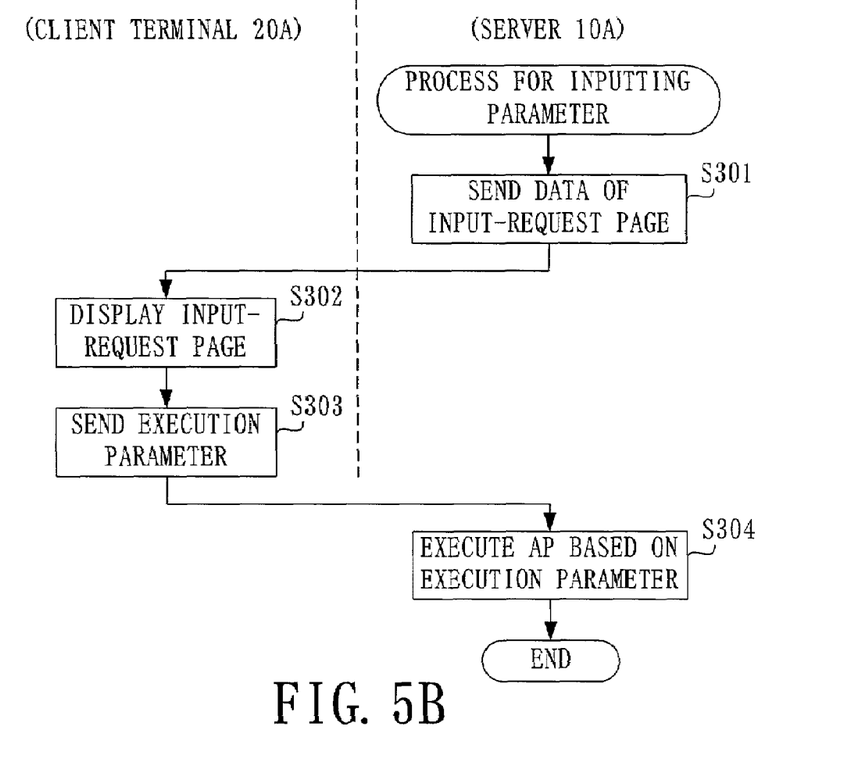

The controller 13 of the server 10A sends data representing an input-request page for requesting the input of the execution parameter, to the client terminal 20A through the communications unit 11 (Step S301).

The controller 25 of the client terminal 20A controls the output unit 23, in response to data supplied from the server 10A, to display the input-request page represented by the supplied data (Step S302). The user operates the input unit 22 to input the execution parameter on the input-request page. The input unit 22 inputs a signal representing the user-input execution parameter to the controller 25, in accordance with the user operation.

In response to the signal supplied from the input unit 22, the controller 25 sends the input information representing the input execution parameter to the server 10A through the communications unit 21 (Step S303).

In response to the input information from the client terminal 20A, the controller 13 of the server 10A continues executing the application program, based on the execution parameter represented by the supplied input information (Step S304).

Upon completion of execution of the application program, the controller 13 sends data representing a printer-selection page for selecting a printer for outputting a result of a process of the application program, to the client terminal 20A through the communications unit 11 (Step S108).

The controller 25 of the client terminal 20A controls the output unit 23 to display the printer-selection page represented by the data supplied from the server 10A (Step S109). On the printer-selection page, one or more printer models which are registered in the printer system are displayed.

The user of the client terminal 20A operates the input unit 22 to select one target printer for outputting the process result, on the displayed printer-selection page. In this embodiment, the model of the printer 30D is selected, by way of example. In response to the user operation, the input unit 22 inputs a signal representing the model of the printer 30D that the user selected, to the controller 25.

In response to a signal from the input unit 22, the controller 25 of the client terminal 20A refers to the printer table stored in the storage unit 24, and identifies the user-specified printer 30D (Step S110).

The controller 25 sends a request for outputting data to the specified printer 30D, to the server 10A (Step S111). Specifically, the controller 25 extracts data regarding the specified printer 30D, from the printer table. The controller 25 sends the extracted data to the server 10A as printer specification information.

The printer specification information represents an IP address of the specified printer 30D, the printer information (the printer model, the manufacturer and the printing performance, etc.) of the specified printer 30D, and maximum communications bandwidth of the client-side circuit for connecting the printer 30D with the network 4, etc.

The controller 13 of the server 10A generates printing data representing the result of the process executed in accordance with the application program, in response to the printer specification information supplied from the client terminal 20A (Step S112).

Specifically, the controller 13 refers to the correspondence table stored in the storage unit 12, using the IP address and printer information which are included in the supplied printer specification information. Upon this, the controller 13 specifies a printer driver corresponding to the selected printer 30D. The controller 13 executes the specified printer driver, thereby generating the printing data for the selected printer 30D.

After this, the controller 13 sends data representing a checking page for checking the output, to the client terminal 20A through the communications unit 11 (Step S113).

The controller 25 of the client terminal 20A controls the output unit 23 to display the checking page represented by the data provided from the server 10A, likewise the above (Step S114). On the checking page, displayed are the model of the printer 30D and an "instruction button" for instructing the server 10A to start outputting data to the printer 30D. The user checks the printer 30D for outputting the data, and operates the input unit 22 to press the "checking button". Then, the input unit 22 inputs a signal for instructing the server 10A to begin the outputting of the data, to the controller 25, in response to the user operation.

In response to the signal from the input unit 22, the controller 25 sends a "start signal" for instructing the server 10A to start printing the data, to the server 10A (Step S115).

In response to the "start signal" from the client terminal 20A, the controller 13 of the server 10A sends an "open-request signal" as a request signal for printing the data, to the printer 30D for outputting the data (Step S116).

In response to the "open-request signal" from the server 10A, the printer 30D prepares for printing (Step S117). Upon completion of the preparation, the printer 30D sends a "ready signal" representing that it is ready for printing, to the server 10A (Step S118).

In response to the "ready signal" from the printer 30D, the controller 13 of the server 10A sends the generated printing data to the printer 30D having the IP address included in the printer specification information, through the communications unit 11 (Step S119).

At this time, the router 10C sends the printing data sent from the server 10A to the network 4, such that the transmission speed of the printing data is equal to or less than a predetermined threshold value. Particularly, the router 10C obtains this threshold value based on the printing performance and maximum communications bandwidth which are included in the printer specification information sent from the client terminal 20A. Then, the router 10C divides the printing data into a plurality of data portions and sends the printing data, such that the transmission speed of the data portions is equal to or less than the obtained threshold value. In this manner, the printing data is sent to the network 4 at the transmission speed of equal to or less than the threshold value.

In the case where the transmission speed of the printing data flowing over the client-side circuit exceeds the threshold value, the transmission speed is adjusted to be equal to or less than the threshold value by the above-described negotiation function.

The printer 30D receives the printing data from the server 10A through the hub 30B and the router 30C. Then, the printer 30D prints a result of the process in accordance with the application program, based on the received printing data (Step S120).

Figure 5C:
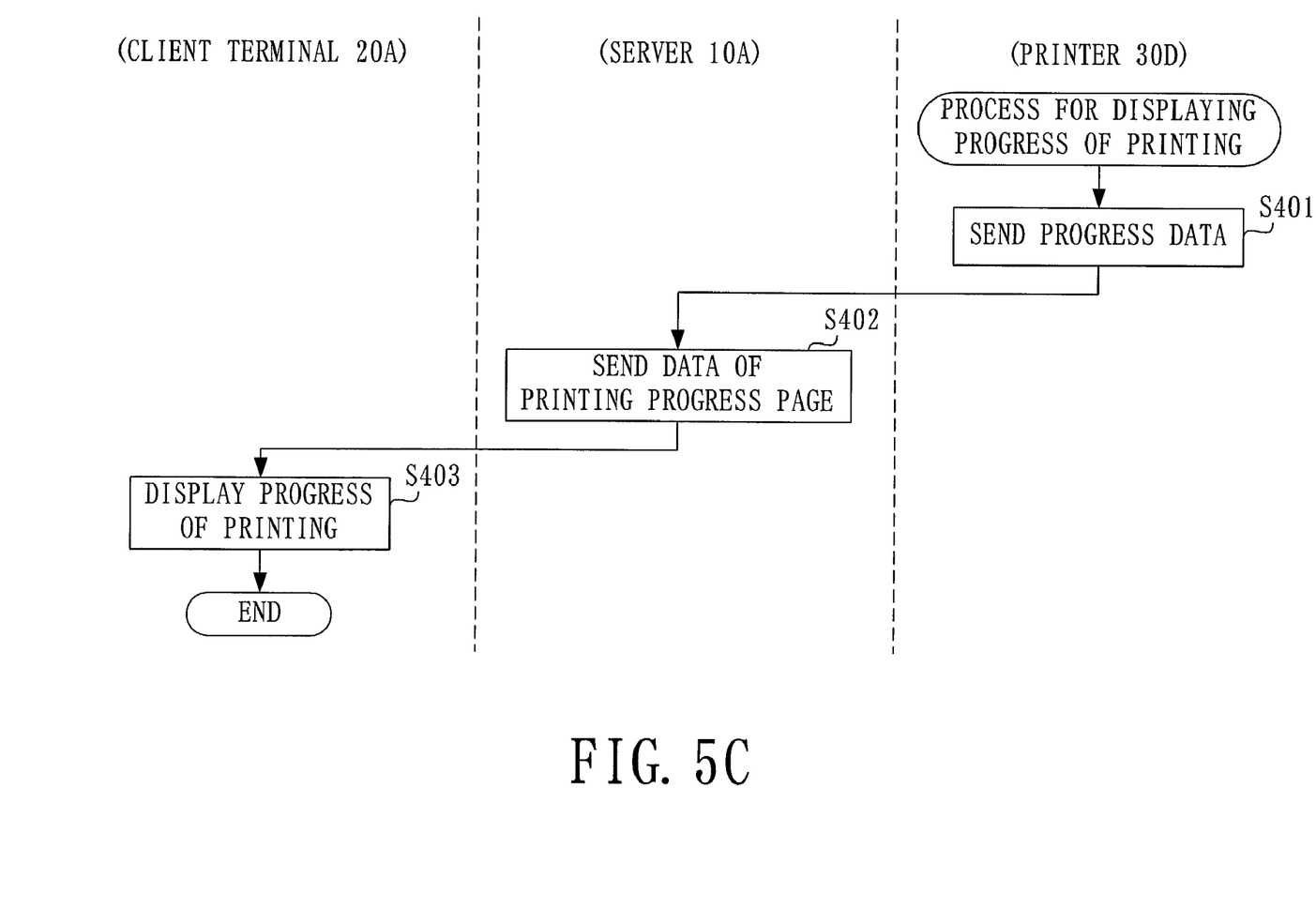

During this printing, the printer system executes a process for displaying the progress of the printing, which is shown in FIG. 5C.

The printer 30D sends progress data representing the progress of the printing to the server 10A (Step S401).

The controller 13 of the server 10A generates data of a display page showing the printing progress, based on the supplied progress data. The controller 13 sends the generated data to the client terminal 20A through the communications unit 11 (Step S402).

Upon reception of the data from the server 10A, the controller 25 of the client terminal 20A controls the output unit 33 to display the display page showing the printing progress, in accordance with the data from the server 10A (Step S403).

Figure 4C:
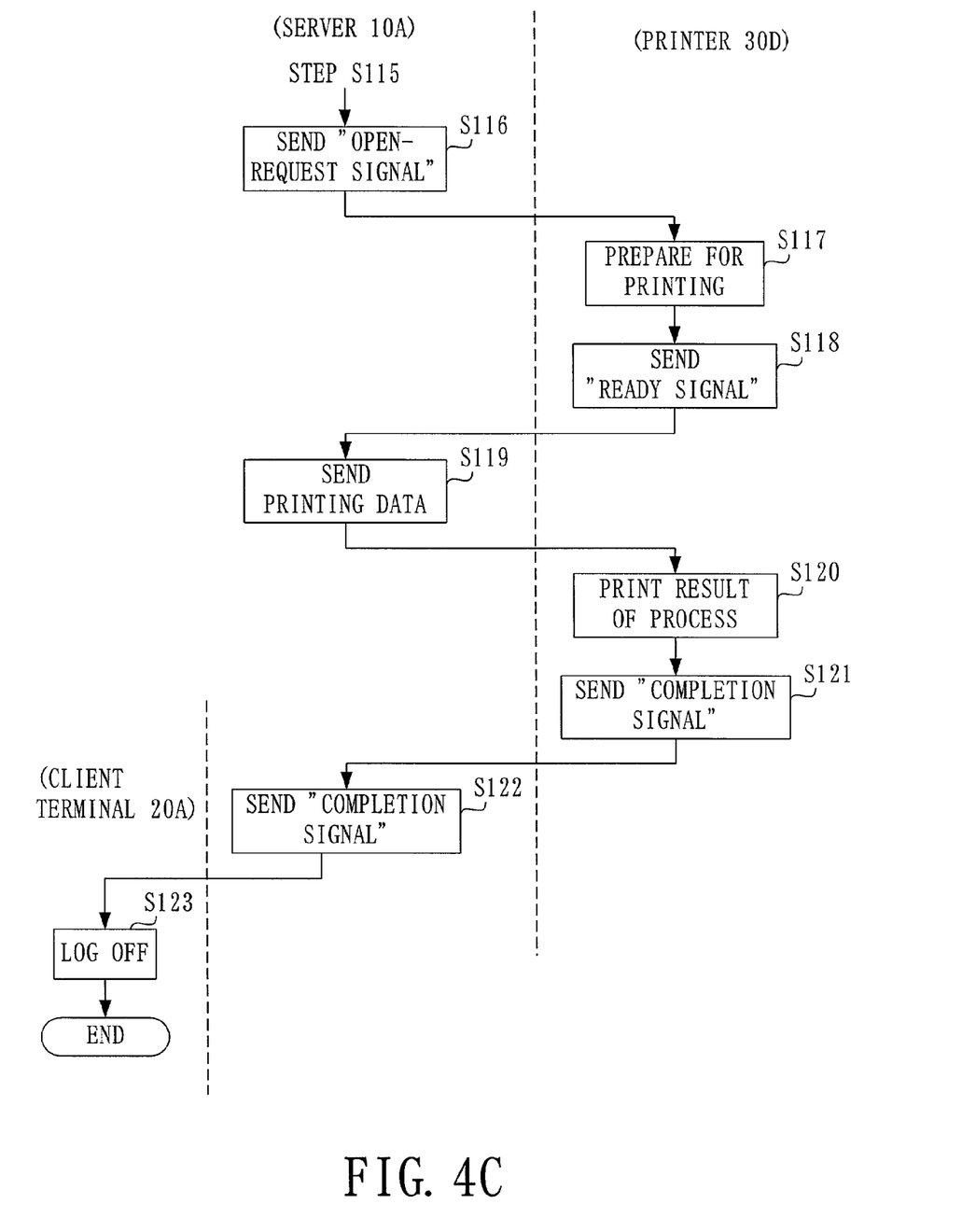

Upon completion of the printing, the printer 30D sends a "completion signal" representing that the printing is completed, to the server 10A (Step S121). After this, the printer 30D carries out a predetermined closing process, so as to be back to a state before it prepares for printing.

The controller 13 of the server 10A sends the "completion signal" sent from the printer 30D to the client terminal 20A (Step S122).

The controller 25 of the client terminal 20A logs off the server 10A, in response to the "completion signal" from the server 10A (Step S123).

In this manner, the application program is completely executed, and the process result is completely printed.

In the embodiment of the present invention, the explanations have been made to the case where the client terminal which is to instruct the server 10A to execute the application program is the client terminal 20A and the printer for performing the printing is the printer 30D. However, the combination of the client terminal and the printer is not limited to the above. For example, the client terminal 20A and the printer 20B may be combined together, any of the client terminals 30A and the printer 20B may be combined together, and any of the client terminals 30A and the printer 30D may be combined together. According to any of the above combinations of the client terminal and the printer, the execution of the application program can be realized and the printing of the process result can be realized.

As explained above, the server 10A executes the application program, and generates the printing data. Hence, the client terminals 20A and 30A simply need to specify the target application program to be executed and the target printer for printing the data. In other words, it is not necessary that the client terminals 20A and 30A have the execution environment of the application program. For example, each of the client terminals 20A and 30A may be a Thin Client terminal or an old-type computer. In this case, those resources including the old computers, etc. can effectively be used.

The application programs and the printer drivers are included in the server 10A, but not in the client terminals 20A and 30A. Thus, the application programs and the printer drivers can be installed and updated only in the server 10A. Therefore, the cost for maintaining the printer system can remarkably be reduced as compared to the conventional printer system.

In a case where to register a new printer, a printer driver corresponding to the new printer is installed in the server 10A, and data regarding the new printer is stored in the server 10A and the client terminals 20A and 30A. By doing this, the new printer can successfully be registered. According to the same manner, an old printer can be replaced with a new printer.

When to install a new printer, a user may operate the client terminal connected to the network 4 to provide the server 10A with information regarding the manufacturer of the new printer. The controller 13 of the server 10A may access the Web page of the manufacturer through the network 4 based on the manufacturer information sent from the client terminal, download a new printer driver corresponding to the new printer from this Web page, and store the downloaded printer driver in the storage unit 12. In doing this, the new printer driver corresponding to the new printer can be installed automatically in the server 10A.

The controller 13 of the server 10A may periodically access the Web page of each manufacturer of the printers connected to the network 4, and download the latest printer driver. In this structure, the server 10A can always have the latest printer driver.

In the case where a printer is made in another country, the user may not fully acquire information regarding its corresponding manufacturer. In the case where the Web page of the manufacture does not show a printer driver corresponding to the user's printer, the server 10A can not downloads the printer driver. In such cases, the controller 13 of the server 10A may directly access the new printer and acquire the printer driver attached to the new printer therefrom, through the network 4. In this manner, as well, the new printer driver corresponding to the new printer can be installed automatically in the server 10A.

In the above-described embodiment, the explanations have been made to the case where each of the plurality of servers 10A includes printer drivers. However, only one of the plurality of servers 10A may include printer drivers. In other words, one of the plurality of servers 10A specializes in the generation and transmission of the printing data, while the rest of the servers 10A (the other server) specialize(s) in the execution of the application program. This can prevent that the execution of the application program will stop as a result of the generation and/or transmission of the printing data. As a result, the application program can promptly and securely be executed.

Every time the process is executed in accordance with the application program and the result of the process is printed, the controller 13 of the server 10A may obtain the charge for a service using the application program in accordance with a predetermined rule, and may charge the user of the information service center for the service. The charge may be calculated in accordance with the type of the application program and the number of printed papers.

The storage unit 12 of the server 10A may store the charge data representing the calculated charge. The controller 13 of the server 10A may submit a bill to each user, based on the charge data stored in the storage unit 12, on a predetermined date of a month (e.g. the end of every month). The charge for services may collectively be calculated, or may individually calculated by each service (e.g. the usage charge of the application program or the printing charge, etc.).

The settlement of the charge may be performed through a financial institution (e.g. a credit-card company, a bank, etc.) connected to the network 4.

The present invention can be adapted not only to the printer system including the home 2, the company 3, and the like, but also to a system including any of various public institutions (e.g. any government related institutions, local governments, schools, etc.).

The present invention can be employed for any services provided by an IDC (Internet Data Center) and an ASP (Application Service Provider) which execute the application program based on the database centrally managed by the server.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-96503 filed on Mar. 29, 2001, and including specification, claims, drawings and summary. The disclosure of the above Japanese Patent Application is incorporated herein by reference in its entirety.

What is claimed is:

1. A printer system comprising:
   a plurality of printers;
   a client terminal which specifies a target printer at which printing is to be performed, of said plurality of printers, wherein said client terminal does not include a printer driver;
   a server which sends printing data for performing printing to the target printer, through a communications network; and
   one router disposed at a server side at which said server is provided and another router disposed at a client terminal side at which said client terminal is provided, and
   wherein said server comprises
      a storage unit which stores a plurality of printer drivers corresponding respectively to said plurality of printers,
      a generation unit which generates printing data for performing printing on the target printer, in response to a request of said client terminal, using one of said plurality of printer drivers which corresponds to said target printer,
      a first sending unit which sends a checking page for checking output of the target printer to said client terminal,
      a second sending unit which sends the printing data which is generated by said generation unit to said target printer through said communications network, in response to a start signal send from said client terminal,
      a downloader configured to download a new printer driver corresponding to a new printer from a Web page of a manufacturer corresponding to the new printer in the case where the Web page shows the new printer driver, and
      an acquisition unit configured to directly access the new printer and acquire the new printer driver corresponding to the new printer therefrom, through said communication network, in the case where the Web page does not show the new printer driver, and
   said client terminal comprises
      a output unit which displays the checking page; and
      a third sending unit which sends the start signal after said output unit displays the checking page, and
   said target printer executes printing in accordance the printing data which is supplied from said sending unit,
   wherein each of said client terminal and said another router monitors a transmission speed at which the printing data is transmitted from said communications network to said target printer, and sends, in a case where the transmission speed exceeds a predetermined threshold value, negotiation information representing that the transmission speed of data transmission from said communications network to said target printer exceeds the predetermined threshold value, to said one router, and said one router, upon reception of said negotiation information, lowers the transmission speed of data transmission from said server to said communications network, and thereby the transmission speed of data transmission from said server to said target printer via said communications network is adjusted to be equal or less than the predetermined threshold value.

2. The printer system according to claim 1, wherein:
said storage unit further stores a plurality of application programs;
said client terminal specifies a target application program to be executed, of the plurality of application programs stored in said storage unit; and
said server further includes an execution unit which executes the application program specified by said client terminal, of said plurality of application programs stored in said storage unit.

3. The printer system according to claim 2, wherein
said generation unit generates data for printing a result of a process executed in accordance with the specified application program.

4. The printer system according to claim 1, wherein
said downloader periodically accesses the Web page of each of the plurality of manufacturers, and downloads a latest printer driver corresponding to each of said plurality of printers.

5. The printer system according to claim 4, wherein
said printer system operates under environment of SBC (Server Based Computing).

6. The printer system according to claim 1, wherein
said printer system operates under environment of SBC (Server Based Computing).

7. A server comprising:
a storage unit which stores a plurality of printer drivers corresponding respectively to a plurality of printers connected to a communications network;
a generation unit which generates printing data for performing printing on a target printer specified by a client terminal that does not include a printer driver, using one of said plurality of printer drivers which corresponds to the target printer;
a first sending unit which sends a checking page for checking output of the target printer to said client terminal;
a second sending unit which sends the printing data generated by said generation unit to the target printer through the communications network in response to a start signal sent from said client terminal;
a downloader configured to download a new printer driver corresponding to a new printer from a Web page of a manufacturer corresponding to the new printer in the case where the Web page shows the new printer driver; and
an acquisition unit configured to directly access the new printer and acquire the new printer driver corresponding to the new printer therefrom, through said communication network, in the case where the Web page does not show the new printer driver,
wherein each of said client terminal and another router disposed at said client terminal side monitors a transmission speed at which the printing data is transmitted from the communications network to the target printer, and sends, in a case where the transmission speed exceeds a predetermined threshold value, negotiation information representing that the transmission speed of data transmission from the communications network to the target printer exceeds the predetermined threshold value, to one router disposed at the server side, and said one router, upon reception of said negotiation information, lowers the transmission speed of data transmission from the server to the communications network, thereby the transmission speed of data transmission from the server to the target printer via the communications network is adjusted to be equal or less than the predetermined threshold value.

8. The server according to claim 7, wherein:
said storage unit further stores a plurality of application programs; and
said server further includes an execution unit which executes one of the plurality of application programs which is specified by said client terminal.

9. The server according to claim 8, wherein
said generation unit generates data for printing an execution result of the application program.

10. The server according to claim 7, wherein
said downloader periodically accesses the Web page of the manufacturer, and downloads a latest printer driver.

11. A printing method comprising the steps of:
specifying, on a client terminal that does not include a printer driver, a target printer for outputting data to request printing, of a plurality of printers connected to a communications network;
generating, on a server, printing data for performing printing on the target printer, in response to the request, using a printer driver corresponding to the target printer, of a plurality of pre-set printer drivers respectively corresponding to the plurality of printers;
sending, on said server, a checking page for checking output of the target printer to said client terminal and the printing data to the target printer through said communications network in response to a start signal sent from said client terminal, through which the transmission speed of data transmission from said server to the target printer is adjusted to equal or less than the predetermined threshold value;
displaying, at the client terminal, the checking page;
sending, from the client terminal, a start signal after the checking page is displayed;
downloading, at said server, a new printer driver corresponding to a new printer from a Web page of a manufacturer corresponding to the new printer in the case where the Web page shows the new printer driver; and
directly accessing, at said server, the new printer to acquire the new printer driver corresponding to the new printer therefrom, through said communication network, in the case where the Web page does not show the new printer driver,
wherein each of said client terminal and another router disposed at said client terminal side monitors a transmission speed at which the printing data is transmitted from said communications network to the target printer, and sends, in a case where the transmission speed exceeds a predetermined threshold value, negotiation information representing that the transmission speed of the data transmission from said communications network to the target printer exceeds the predetermined threshold value, to one router disposed at said server side, and said one router, upon reception of said negotiation information, lowers the transmission speed of data transmission from said server to said communications network; and executing, on said target printer, printing in accordance with the printing data sent from said server.

12. The printing method according to claim 11, wherein said server stores a plurality of application programs, and said method further comprising the steps of:
specifying, on said client terminal, a target application program to be executed, of the plurality of application programs; and
executing, on said server, the application program specified on the client terminal.

13. The printing method according to claim 12, wherein said step of generating the printing data includes a step of generating data for printing an execution result of the specified application program.

14. The printing method according to claim 11, wherein said step of downloading includes a step of periodically accessing, on said server, the Web page of the manufacturer, and downloading a latest printer driver.

15. A computer readable storage medium storing a program for controlling a computer to serve as a server comprising:
a storage unit which stores a plurality of printer drivers corresponding respectively to a plurality of printers connected to a communications network;
a generation unit which generates printing data for performing printing on a target printer specified by a client terminal that does not include a printer driver, using one of the plurality of printer drivers which corresponds to the target printer;
a first sending unit which sends a checking page for checking output of the target printer to said client terminal;
a second sending unit which sends the printing data generated by said generation unit to the target printer through the communications network in response to a start signal sent from said client terminal;
a downloader configured to download a new printer driver corresponding to a new printer from a Web page of a manufacturer corresponding to the new printer in the case where the Web page shows the new printer driver; and
an acquisition unit configured to directly access the new printer and acquire the new printer driver corresponding to the new printer therefrom, through said communication network, in the case where the Web page does not show the new printer driver,
wherein each of said client terminal and another router disposed at said client terminal side monitors a transmission speed at which the printing data is transmitted from the communications network to the target printer, and sends, in a case where the transmission speed exceeds a predetermined threshold value, negotiation information representing that the transmission speed of data transmission from the communications network to the target printer exceeds the predetermined threshold value, to one router disposed a the server side, and said one router, upon reception of said negotiation information, lowers the transmission speed of data transmission from the server to the communications network, and thereby the transmission speed of data transmission from the server to the target printer via the communications network is adjusted to be equal to or less than the predetermined threshold value.

16. A printer system comprising:
a plurality of printers;
a client terminal which specifies a target printer at which printing is to be performed, of said plurality of printers, wherein said client terminal does not include a printer driver;
a server which sends printing data for performing printing to the target printer, through a communications network;
one router disposed at said server side and other router disposed at said client terminal side, and
wherein said server comprises
a storage unit which stores a plurality of printer drivers corresponding respectively to said plurality of printers,
a generation unit which generates the printing data, using one of said plurality of printer drivers which corresponds to said target printer,
a first sending which sends a checking page for checking the output of the target printer to said client terminal;
a second sending unit which sends the printing data which is generated by said generation unit to said target printer through said communications network, in response to a start signal sent from said client terminal;
a downloader configured to download a new printer driver corresponding to a new printer from a Web page of a manufacturer corresponding to the new printer in the case where the Web page shows the new printer driver; and
an acquisition unit configured to directly access the new printer and acquire the new printer driver corresponding to the new printer therefrom, through said communication network, in the case where the Web page does not show the new printer driver, and
said client terminal comprises
an output unit which displays the checking page; and
a third sending unit which sends the start signal after said output unit displays the checking page, and
said target printer executes printing in accordance the printing data which is supplied from said sending unit,
wherein each of said client terminal and said other router monitors a transmission speed at which the printing data is transmitted from said communications network to said target printer, and sends, in a case where the transmission speed exceeds a predetermined threshold value, negotiation information representing that the transmission speed of data transmission from said communications network to said target printer exceeds the predetermined threshold value, to said one router, and said one router, upon reception of said negotiation information lowers the transmission speed of data transmission from said server to said communication network, and thereby the transmission speed of data transmission from said server to said target printer via said communications network is adjusted to be equal or less than the predetermined threshold value.

* * * * *